United States Patent [19]

Graetzel et al.

[11] 4,405,424

[45] Sep. 20, 1983

[54] METHOD FOR PRODUCING HYDROGEN AND ELEMENTAL SULPHUR BY PHOTOCHEMICAL OXIDATION-REDUCTION OF HYDROGEN SULPHIDE AND METAL SULPHIDES

[75] Inventors: Michael Graetzel, 2, chemin Pontfilet, 1093 La Conversion, Switzerland; Kuppuswamy Kalyanasundaram, Chavannes; Enrico Borgarello, Echandens, both of Switzerland; Ezio Pelizzetti, Turin, Italy

[73] Assignee: Michael Graetzel, La Conversion, Switzerland

[21] Appl. No.: 383,272

[22] Filed: May 28, 1982

[30] Foreign Application Priority Data

Jun. 3, 1981 [CH] Switzerland .................... 3636/81

[51] Int. Cl.³ ............................................ B01J 19/12
[52] U.S. Cl. ............................................ 204/157.1 R
[58] Field of Search ................................ 204/157.1 R

[56] References Cited

U.S. PATENT DOCUMENTS

| 3,933,608 | 1/1976 | Haas | 204/164 |
| 3,962,409 | 6/1976 | Kotera | 423/571 |
| 4,094,751 | 6/1978 | Nozik | 204/157.1 R |

FOREIGN PATENT DOCUMENTS 2432475  2/1980  France ................. 204/157.1 W

OTHER PUBLICATIONS

Helvetica Chemica Acta, vol. 64, No. 35, Fase 1, Feb. 1981, K. Kalyanasundaram et al.

*Primary Examiner*—Howard S. Williams
*Attorney, Agent, or Firm*—Stevens, Davis, Miller & Mosher

[57] ABSTRACT

Hydrogen and elemental sulphur are produced by irradiation by visible light of solutions of hydrogen sulphide or of metal sulphides in presence of a catalyst consisting of a semiconductor material, such as cadmium sulphide, coated with a transparent layer of ruthenium oxide.

13 Claims, No Drawings

METHOD FOR PRODUCING HYDROGEN AND ELEMENTAL SULPHUR BY PHOTOCHEMICAL OXIDATION-REDUCTION OF HYDROGEN SULPHIDE AND METAL SULPHIDES

It is known that electromagnetic radiation, and particularly solar radiation, may dissociate water into hydrogen and oxygen in the presence of catalysts selected from semiconductor materials. This process has been proposed for collecting solar energy in a storable form. However, hydrogen sulphide, which is an important by-product of industries using fossil fuels, may turn out to be a hydrogen source more interesting than water, since its dissociation enthalpy is lower than that of water, and also taking into account the possibility of vaporising the sulphur. Similar advantages may be reckoned from the photochemical dissociation of metal sulphides in an aqueous medium, providing that those sulphides are at least slightly water soluble.

It has now been discovered that the photochemical oxidation-reduction of hydrogen sulphide and metal sulphides by electromagnetic radiation produces hydrogen and elemental sulphur with an excellent yield and at a high speed when irradiating the hydrogen or metal sulphide in solution in a solvent and in the presence of a catalyst consisting of a semiconductor material of which the surface intended to be illuminated is covered with a transparent layer of ruthenium oxide ($RuO_2$).

An aqueous solvent is used particularly when the feed sulphur material is a metal sulphide, so that the water forms the hydrogen source as explained hereabove. When the feed sulphur material is hydrogen sulphide, the water may be replaced by an organic solvent, such as for example carbon bisulphide, acetonitrile and dimethylsulphoxide.

It has been noted that in the case of an aqueous solvent, a basic pH increases substantially the speed of the oxidation-reduction. Thus, there has been observed a four-fold increase of the hydrogen production speed by passing from the pH 0 to the pH 14.

The semiconductor material used as a catalyst may be selected particularly among cadmium sulphide (CdS), cadmium selenide (CdSe), gallium phosphide (GaP) and silicon. The catalyst is preferably free of platinum, since it has been proved that platinum does not bring any advantage in the photochemical oxidation-reduction of hydrogen sulphide and metal sulphides, contrary to the oxidation-reduction of water. The semiconductor material may be in the form of macroscopic particles or in a colloidal form. The colloidal form has the advantage of allowing an easy collection of the reduced sulphur by means of a simple filtration, since the catalyst remains in the colloidal solution and may be reused.

In the absence of ruthenium oxide, the semiconductor material gives insufficient results. It has been noted that, all proportions being equal, the ruthenium oxide may double the speed of the oxidation-reduction reaction. Particularly, it has been noted an increase of the hydrogen production speed of 1.5 times when the $RuO_2$ content of the cadmium sulphide particles was increased from 0.1 to 0.2%. The favourable effect of ruthenium oxide is probably connected to an acceleration of the transfer of the network holes of the semiconductor material between the valence band and the interface with the $S^{--}$ ions of the feed sulphur material. This transfer acceleration of the holes reduces the destruction of the holes by recombination with the electrons.

The catalyst activity is increased by a doping, promoting the conductibility of "n" type. In the case of cadmium sulphide, such doping may be carried out by replacing a small amount of $S^{--}$ ions by less negatively charged ions, such as $Cl^-$ ions, and/or by replacing a small fraction of $Cd^{++}$ ions by more positively charged ions, such as $In^{+++}$ ions. For example, it is possible to calcine cadmium sulphide which has been previously impregnated with indium trichloride, which provides simultaneously both substitution types. However, it is preferable to use ruthenium trichloride as the impregnating agent of the cadmium sulphide. The cadmium sulphide impregnated with ruthenium trichloride is calcined at a temperature of about 300° C., initially under an inert atmosphere, and then in presence of oxygen. Thus, there is effected in a single operation the doping and the coating of the cadmium sulphide particles with a layer of $RuO_2$.

EXAMPLE 1

To prepare the catalyst, 200 mg of cadmium sulphide powder at 99.99% have been mixed 50 ul of a solution of 60 mg of pure aq. $RuCl_3$ (10% $H_2O$) in 3 ml of water. After having dried the powder in the open air during 15 minutes, it has been heated at 300° C., first for 30 minutes under an argon stream, and then for 2 to 5 minutes under the open air, and finally it has been allowed to cool under the open air. This thermal treatment has formed a deposit of $RuO_2$ on the surface of the CdS particles, and a doping of the "n" type by substitution of $Cl^-$ ions to the $S^{--}$ ions in the CdS network. The quantity of $RuO_2$ deposited on the CdS is 0.1% by weight.

These CdS particles loaded with $RuO_2$ have been dispersed in sulphide aqueous solutions and irradiated with visible light. An irradiation of 25 ml of an aqueous solution of $Na_2S$ 0.1 M (pH 3) containing in suspension 25 mg of CdS loaded with 0.025 mg of $RuO_2$ has been effected with a halogen incandescent lamp of 250 W (Oriel) provided with a water jacket of 15 cm and a filter stopping the radiation of a wavelength smaller than 400 nm, to eliminate the IR and UV radiations, respectively. After a short induction period, there is an emission of hydrogen, regularly, at a rate of 3.2 ml/h. The experiment has been continued up to a total volume of 54 ml of $H_2$, which corresponds to a conversion of 90% of $H_2S$ into $H_2$ and molar ratios $H_2/CdS$ and $H_2/RuO_2$ of 11 and $1.2 \times 10^4$, respectively. The reduced sulphur precipitates and gathers at the surface of the solution, which allows to collect it by separating it from the catalyst.

EXAMPLE 2

By irradiating in the same conditions 25 ml of an aqueous solution of $Na_2S$ 0.1 M and having a pH of 13 and containing 25 mg of CdS loaded with 0.2% of $RuO_2$, a hydrogen emission speed of 9 ml/h has been obtained.

EXAMPLE 3

It has been proceeded as in example 1, but replacing the cadmium sulphide powder by colloidal cadmium sulphide. The aqueous dispersion of the catalyst has been prepared as follows:

"Calgon C" (trade mark for sodium hexametaphosphate) has been dissolved in neutral water in a proportion of 0.5 mg of "Calgon C"/liter, and cadmium nitrate $Cd(NO_3)_2$ has been added to the solution in a proportion of 0.001 mole/liter. Sodium sulphide $Na_2S$ has been slowly injected in this solution at a rate of 0.001 mole/liter. (For this injection, there has been used a solution-stock of $Na_2S$ 0.1 M in water).

A colloidal solution of cadmium sulphide at a pH of 7.5 is thus formed. The size of the particles is about 200 Å. There has been added to this colloidal CdS solution 1.8 ml of an aqueous solution of ruthenium oxide $RuO_4$ containing 100 mg $RuO_4$/liter. Within about 30 min, $RuO_4$ is spontaneously decomposed into $O_2$ and $RuO_2$ which deposits on the CdS particles in a quantity of 0.1% by weight with respect to CdS.

We claim:

1. Method for producing hydrogen and elemental sulphur by photochemical oxidation-reduction of hydrogen sulphide and metal sulphides by an electromagnetic radiation comprising visible radiation, characterized in that an irradiation is effected of the hydrogen sulphide or the metal sulphide in solution in a solvent and in the presence of a catalyst consisting of a semiconductor material, the surface of the semiconductor material to be illuminated being covered by a transparent layer of $RuO_2$.

2. Method according to claim 1, characterized in that the solvent comprises water.

3. Method according to claim 1, characterized in that the solvent is an organic solvent.

4. Method according to one of claims, 1, 2 or 3 characterized in that hydrogen sulphide or metal sulphide is irradiated in a basic aqueous medium at a pH of at least 12.

5. Method according to claim 4, wherein the pH is at least 14.

6. Method according to claim 3, wherein said organic solvent is selected from carbon bisulfide, acetonitrile, and dimethyl sulphoxide.

7. Method according to any one of the preceding claims, 1, 2 or 3 characterized in that the catalyst is free of platinum.

8. Method according to one of claims, 1, 2 or 3 characterized in that the semiconductor material is selected from CdS, CdSe, GaP, and silicon.

9. Method according to any one of claims, 1, 2 or 3 characterized in that the semiconductor material is cadmium sulphide in a colloidal form.

10. Method according to one of claims, 1, 2 or 3 characterized in that the semiconductor material is an "n"-type doped material.

11. Method according to claim 10, characterized in that the semiconductor material is cadmium sulphide doped by substitution of $Cl^-$ ions for a portion of $S^{--}$ ions.

12. Method for the preparation of the catalyst according to claim 11, characterized in that the doping is obtained by calcining the cadmium sulphide impregnated with a chloride dissociable at the calcination temperature.

13. Method according to claim 12, characterized in that the cadmium sulphide is impregnated with ruthenium chloride $RuCl_3$, and is then calcined at about 300° C. under an inert atmosphere to dissociate $RuCl_3$, and is then calcined in presence of oxygen to oxidize ruthenium into $RuO_2$.

* * * * *